US010581896B2

United States Patent
Nachenberg et al.

(10) Patent No.: US 10,581,896 B2
(45) Date of Patent: Mar. 3, 2020

(54) REMEDIAL ACTIONS BASED ON USER RISK ASSESSMENTS

(71) Applicant: Chronicle LLC, Mountain View, CA (US)

(72) Inventors: Carey Stover Nachenberg, Manhattan Beach, CA (US); Maxime Lamothe-Brassard, Mountain View, CA (US); Svetla Yankova Yankova, Mountain View, CA (US)

(73) Assignee: Chronicle LLC, Mountain View, CA (US)

( * ) Notice: Subject to any disclaimer, the term of this patent is extended or adjusted under 35 U.S.C. 154(b) by 215 days.

(21) Appl. No.: 15/452,861

(22) Filed: Mar. 8, 2017

(65) Prior Publication Data

US 2018/0191770 A1 Jul. 5, 2018

Related U.S. Application Data

(60) Provisional application No. 62/440,612, filed on Dec. 30, 2016.

(51) Int. Cl.

| H04L 29/06 | (2006.01) |
|---|---|
| G06N 20/00 | (2019.01) |
| G06F 21/50 | (2013.01) |
| G06F 21/55 | (2013.01) |
| G06F 21/31 | (2013.01) |

(52) U.S. Cl.
CPC ........ *H04L 63/1441* (2013.01); *G06F 21/316* (2013.01); *G06F 21/50* (2013.01); *G06F 21/554* (2013.01); *G06N 20/00* (2019.01); *H04L 63/1425* (2013.01); *H04L 63/1433* (2013.01)

(58) Field of Classification Search
CPC ....... G06F 21/50; G06F 21/316; G06F 21/554
See application file for complete search history.

(56) References Cited

U.S. PATENT DOCUMENTS

| 8,239,953 B1 * | 8/2012 | Satish ................... H04L 63/105 726/1 |
|---|---|---|
| 8,478,708 B1 | 7/2013 | Larcom |
| 9,129,257 B2 * | 9/2015 | Saunders ........... G06Q 10/0635 |
| 9,600,659 B1 * | 3/2017 | Bird ........................ G06F 21/50 |

(Continued)

OTHER PUBLICATIONS

Kent, A.D. and Liebrock, L.M., May 2013. Differentiating user authentication graphs. In Security and Privacy Workshops (SPW), 2013 IEEE (pp. 72-75). IEEE. (Year: 2013).*

(Continued)

*Primary Examiner* — James R Turchen
(74) *Attorney, Agent, or Firm* — Fish & Richardson P.C.

(57) ABSTRACT

In some implementations, a method includes receiving, for each of multiple users, user activity data describing actions taken by the user by use of a user device over a period of time, determining, for each user and based on the actions taken by the user over the period of time and user responsibility data that describe responsibilities of the user, a risk assessment representative of a security risk resulting from the actions taken by the user by use of the user device, and determining, by the data processing apparatus, for each user and based on the risk assessment determined for the user, whether to implement a user-specific remedial action directed to risk mitigation.

19 Claims, 7 Drawing Sheets

(56) References Cited

U.S. PATENT DOCUMENTS

| | | | |
|---|---|---|---|
| 10,015,175 B2* | 7/2018 | Kent | G06K 9/6277 |
| 10,091,231 B1* | 10/2018 | Gates | H04L 63/1433 |
| 2003/0046128 A1* | 3/2003 | Heinrich | G06Q 10/0635 |
| | | | 705/7.28 |
| 2005/0197952 A1* | 9/2005 | Shea | G06Q 40/025 |
| | | | 705/38 |
| 2006/0020814 A1 | 1/2006 | Lieblich et al. | |
| 2008/0288330 A1* | 11/2008 | Hildebrand | G06Q 10/06 |
| | | | 705/7.28 |
| 2009/0282476 A1* | 11/2009 | Nachenberg | G06F 21/577 |
| | | | 726/22 |
| 2009/0328209 A1* | 12/2009 | Nachenberg | G06Q 10/10 |
| | | | 726/22 |
| 2013/0007245 A1 | 1/2013 | Malik et al. | |
| 2014/0181968 A1* | 6/2014 | Ge | H04L 63/1416 |
| | | | 726/23 |
| 2014/0196110 A1* | 7/2014 | Rubinstein | H04L 63/08 |
| | | | 726/3 |
| 2015/0172300 A1* | 6/2015 | Cochenour | H04L 63/145 |
| | | | 726/23 |
| 2016/0099972 A1 | 4/2016 | Qureshi et al. | |
| 2016/0127417 A1* | 5/2016 | Janssen | H04L 63/20 |
| | | | 726/1 |
| 2016/0306965 A1* | 10/2016 | Iyer | G06F 21/552 |
| 2016/0373477 A1* | 12/2016 | Moyle | G06F 21/552 |
| 2017/0126712 A1* | 5/2017 | Crabtree | H04L 63/1425 |
| 2017/0359220 A1* | 12/2017 | Weith | H04L 41/0893 |
| 2018/0124091 A1* | 5/2018 | Sweeney | H04L 63/1425 |
| 2018/0144138 A1* | 5/2018 | Zhang | H04L 63/1433 |

OTHER PUBLICATIONS

Chen, Y., Nyemba, S., Zhang, W. and Malin, B., 2012. Specializing network analysis to detect anomalous insider actions. Security informatics, 1(1), p. 5. (Year: 2012).*

International Search Report and Written Opinion issued in International Application No. PCT/US2017/066595, dated Apr. 18, 2018, 18 pages.

* cited by examiner

SEARCH ENGINE A

[ how to set up direct deposit for company bank account ]

Not a Scam! EZ Set-up for your direct deposit!
Click here to easily set up direct deposit! Just sign in to your bank account...

Setting Up Direct Deposits – Bank A
Save time and money by setting up direct deposit today...

Setting Up Direct Deposits – Bank B
Direct deposit is an easy way to have checks deposited automatically...

How to Set Up Direct Deposit | Direct Deposit Authorization Form
Click to download the Direct Deposit Authorization...

How to Set Up Direct Deposit – Bank C
Manage Your Account link and menu. Press enter to navigate...

Working in Payroll for Dummies
What to do when you are really confused...

John, according to your your risk assessment, you are a high risk user. You can improve your risk assessment score by reducing the number of suspicious websites you visit, such as this one. Do you want to navigate away?

[ YES ]   [ NO ]

FIG. 5

REMEDIAL ACTIONS BASED ON USER RISK ASSESSMENTS

CROSS-REFERENCE TO RELATED APPLICATION

This application claims the benefit of U.S. Provisional Application No. 62/440,612, filed Dec. 30, 2016, the contents of which are incorporated by reference herein.

BACKGROUND

This specification generally relates to cyber-security. Cyber-security of an organization is affected by each user within the organization. Every action of every user has an effect on the security of the overall organization.

SUMMARY

In some implementations, a security system can monitor the activity of certain users of a system to ensure that users are taking appropriate actions and to prevent breaches in security of an organization. The system can perform remedial actions to reduce or prevent further risk to an organization. For example, the system can determine that a user often opens files in emails from external sources, and that a large fraction of those files contain malicious software. The system can then provide the user with a message asking for justification before allowing the user to open another file from an external source.

In some examples, the system can generate reports that inform a user of their risk assessment relative to other users. The system can use these reports to gamify improving cyber-security, by providing users with an incentive to increase their risk assessment rankings. For example, the system may provide a user with their ranking relative to their coworkers, and offer rewards for being among the top ranking users.

In some examples, the system can restrict access to certain resources that a user wishes to access. For example, while the user may wish to access certain financial documents within the organization, the system may determine that the user's risk assessment is poor, and that the user is not allowed to access sensitive information.

In some examples, the system can present users with a report of their risk assessment and the factors that make up their score to help the user understand what they can do to improve their risk assessment. For example, the system can present a user who is close to a higher ranking with a report of their risk assessment and provide suggested actions the user can take to improve their risk assessment.

According to one innovative aspect of the subject matter described in this specification, a method includes receiving, at a data processing apparatus and for each of a plurality of users, user activity data describing a plurality of actions taken by the user by use of a user device over a period of time. The method includes determining, by the data processing apparatus, for each user and based on the actions taken by the user over the period of time and user responsibility data that describe responsibilities of the user, a risk assessment representative of a security risk resulting from the actions taken by the user by use of the user device. The method further includes determining, by the data processing apparatus, for each user and based on the risk assessment determined for the user, whether to implement a user-specific remedial action directed to risk mitigation.

Implementations may include one or more of the following features. For example, the risk assessment may include one or more security hygiene scores. In some implementations, the risk assessment includes one or more security hygiene scores, and determining for each user and based on the risk assessment determined for the user, whether to implement a user-specific remedial action directed to risk mitigation includes determining, based on a user action taken by a user, and the one or more security hygiene scores, whether to implement the user-specific remedial action.

In some implementations, determining, by the data processing apparatus, for each user and based on the actions taken by the user or their device over the period of time, a risk assessment representative of a security risk resulting from the actions includes generating, by the data processing apparatus and using at least one of: machine learning, a rule set, or user input, the risk assessment of the security risk resulting from the actions taken by the user or their device.

In some implementations, the user-specific remedial action includes presenting a message to the user, prompting the user not to take a current user device action. In some implementations, the user-specific remedial action includes presenting a message to the user, requesting that the user provide additional input before executing a current user device action being attempted by the user. In some implementations, the user-specific remedial action includes presenting a message to the user, informing the user that a current user device action being attempted by the user will not be executed. In some implementations, the user-specific remedial action includes blocking one of: a current user device action being attempted by the user, an activity related to the current user device action, or an activity related to the user's risk assessment. In some implementations, the user-specific remedial action includes presenting a report including the user's risk assessment to the user.

In some implementations, the user is one of a set of users that belong to a group within an organization. In some implementations, the method further includes receiving, at the data processing apparatus and for each of a plurality of users, user responsibility data describing responsibilities of the user within the organization, and determining, by the data processing apparatus, for each user and based on the actions taken by the user or their device over the period of time, a risk assessment representative of a security risk resulting from the actions taken by the user or their device includes determining, by the data processing apparatus, for each user and based on the actions taken by the user or their device and the user responsibility data, a risk assessment for the user. The user responsibility data describing responsibilities of the user within the organization may include a sensitivity assessment representative of a security risk associated with data to which the user has access. In some implementations, the method further includes, for a particular user, comparing, by the data processing apparatus, the user's risk assessment to risk assessments of other users of the set of users that belong to the group within the organization, determining, by the data processing apparatus and based on the comparing, a rank of the user among the set of users that belong to the group within the organization, and providing, by the data processing apparatus and to the user, a message including the rank of the user.

In some implementations, the user-specific remedial action includes restricting the user's access to a set of resources. In some implementations, the user-specific remedial action includes presenting a message including a prescriptive recommendation to the user. The prescriptive recommendation may include a suggested next user device action for the user to take.

In general, another innovative aspect of the subject matter described in this specification can be embodied in a system that includes one or more user devices, and a remote server that includes one or more computing devices and that is connected to the one or more user devices over a network. The remote server may perform operations including receiving, at the remote server and for each of a plurality of users from the one or more user devices, user activity data describing a plurality of actions taken by the user over a period of time, determining, by the remote server, for each user and based on the actions taken by the user by use of a user device over the period of time and user responsibility data that describe responsibilities of the user, a risk assessment representative of a security risk resulting from the actions taken by the user by use of the user device, and determining, by the remote server, for each user and based on the risk assessment determined for the user, whether to implement a user-specific remedial action directed to risk mitigation. In some implementations, the risk assessment comprises one or more security hygiene scores.

In general, another innovative aspect of the subject matter described in this specification can be embodied in non-transitory computer readable media storing instructions that when executed by one or more computing devices, cause the one or more computing devices to perform operations. The operations include receiving, at the one or more computing devices and for each of a plurality of users, user activity data describing a plurality of actions taken by the user by use of a user device over a period of time, determining, by the one or more computing devices, for each user and based on the actions taken by the user over the period of time and user responsibility data that describe responsibilities of the user, a risk assessment representative of a security risk resulting from the actions taken by the user by use of the user device, and determining, by the one or more computing devices, for each user and based on the risk assessment determined for the user, whether to implement a user-specific remedial action directed to risk mitigation. In some implementations, the risk assessment comprises one or more security hygiene scores.

The subject matter described in this specification can be implemented in particular embodiments so as to realize one or more of the following advantages. The disclosed system provides incentive for organizations and/or individuals to improve their security habits. The system provides the ability to proactively reduce security risk and continuously improve security health by monitoring and improving their risk assessment as a key performance indicator and utilizing the prescriptive recommendations to increase it optimally.

The system provides insights into user behavior and the risks associated with certain user actions. These insights may be used to identify weak links in a network or organization. In some examples, the insights may be used by administrators of an organization to reduce exposure and to eliminate potential attack vectors, such as individuals with risky browsing patterns or teams that don't practice care when handling sensitive information.

In some examples, the system provides prescriptive recommendations. For example, the system may provide suggestions on the best next action for a user to improve their risk assessment. In some examples, the system provides suggestions for improving overall security health of an organization. For example, the system may recommend actions that will increase the user's risk assessment metric the most.

In some examples, the system allows for central control of cyber-security infrastructure of an organization to influence users to engage in positive cyber-security behavior. For example, if a specific application increases a company's security risks, companies can be given the option to block, make access to the application "request only," or throttle access to the application.

In some examples, the system can be used to generate a risk assessment for users. The users may be able to use the risk assessments as a means to obtain access. For example, employees who need access to a sensitive system may be required by their organization to have an excellent risk assessment. In such situations, the risk assessment naturally incentivizes positive behaviors organizationally.

In some examples, companies may use risk assessments for users as a business metric. For example, companies may require that their vendors report their aggregate risk assessment. In some examples, companies may require that their vendors have a good or excellent assessment. In some examples, by requiring that the vendors provide their risk assessment, the risk assessment may provide an economic incentive for businesses to improve their cyber-security.

In some examples, the system provides the ability to report on and stack rank organizations for users. For example, providing the ability to report on risk assessments allows companies to provide a level of transparency. This transparency may force organizations to tackle long term initiatives to improve user trust, demonstrate progress, and nurture a healthy competition among digital businesses toward continuously pushing boundaries of security.

As the risk assessment of a system is directly proportionate to the risk assessment of its subsystems and the types of access these subsystems have, by improving the risk assessment of users, teams, devices or networks in an organization, and targeting weak links first, the organization can improve its overall security outcomes and reduce the likelihood of an attack. Such improvements will also result in an improved overall risk assessment for the organization, which may help it when conducting business with other security-conscious firms or users.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3-5 are illustrations of processes in which the security monitoring system performs user-specific remedial actions.

DETAILED DESCRIPTION

Cyber-security is an increasingly important field of technology. In some examples, many users within an organization take actions that present security risks, but it is difficult to monitor every user's actions. A new approach to measuring and improving enterprise cyber-security outcomes (reducing the risk of infection, leak, breach or unauthorized compromise of information) includes quantifying security health of users and providing a recommendation or performing a remedial action to improve the security health. The proposed system uses behavioral, configuration and other security-related metrics that are positively or negatively correlated to security risk. In some examples, these metrics can be aggregated into a comparative metric that reflects the security health of all users, endpoints, and networks in an organization. This metric can then be used to identify weak links, predict risk, and provide prescriptive recommendations on how to optimally improve one's security outcomes. In some examples, the system uses the individual metrics and/or the comparative metric to determine whether to take remedial actions to improve cyber-security for the organization. In some examples, the remedial actions include messages to users suggesting safer actions and choices. For example, a message may be presented to a user who is presently attempting to send an email with an attachment containing confidential information. In some examples, the remedial actions include restricting a user's access to certain resources. Remedial actions may include various other actions. This forms a type of a feedback loop which will lead to overall improved cyber security outcomes and reduce the likelihood and/or impact of a cyber-attack.

In one general implementation, a method for improving cyber security includes receiving user activity data for multiple users. The user activity data describes user device actions taken by the respective user over a period of time. In some examples, the user activity data includes a history of the user's actions associated with a particular organization. The method includes determining a risk assessment representative of a security risk resulting from the user device actions taken by the user based on the user activity data. The risk assessment is used to determine whether to implement a remedial action that is specific to the user and that is directed to risk mitigation. For example, a remedial action can include asking a user to provide an explanation before allowing a download, preventing the user from downloading the file entirely, or other various actions.

Figure 1A:
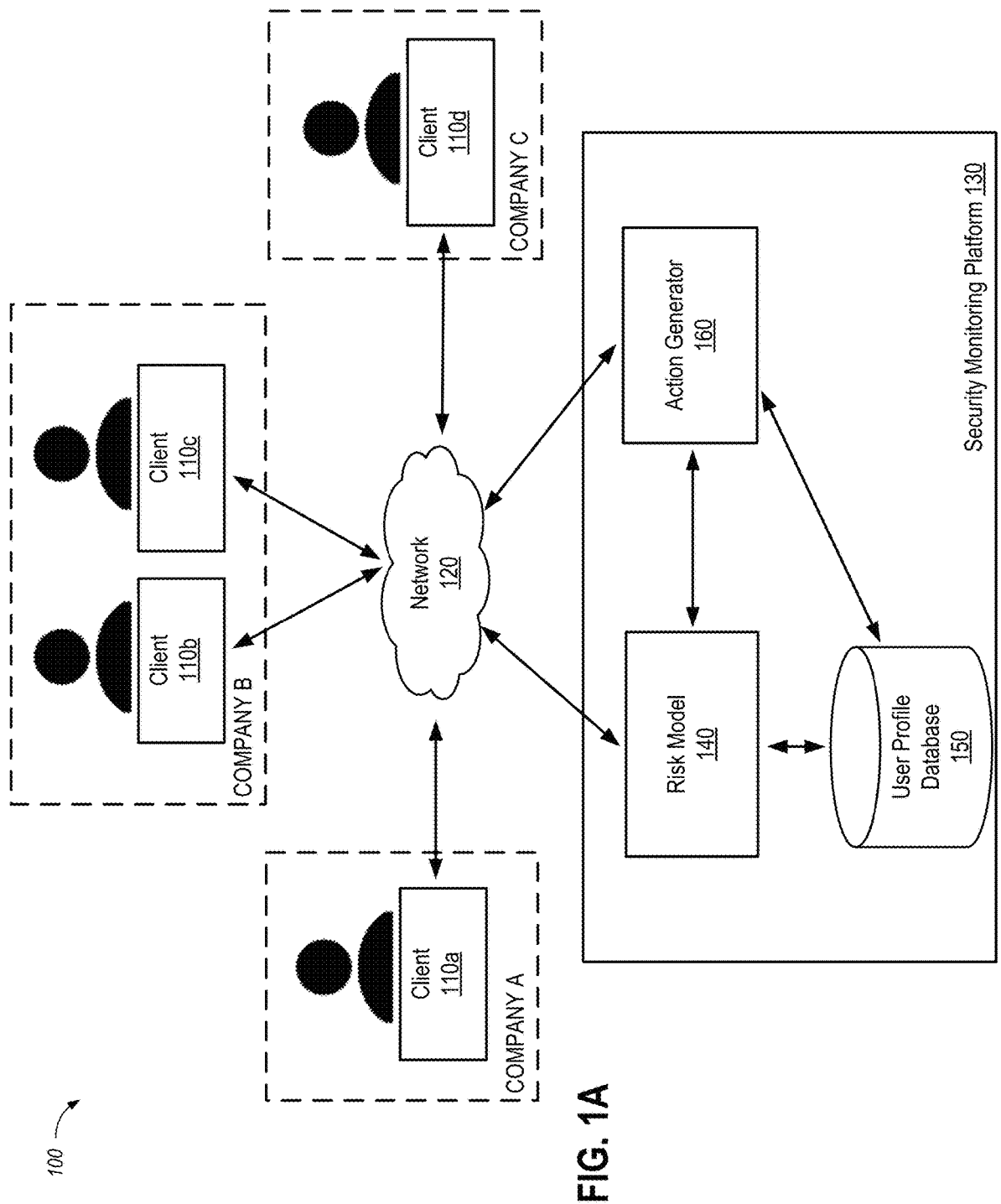
FIG. 1A is a system diagram that illustrates an example of a security monitoring system.

FIG. 1 illustrates a system diagram of an example security monitoring system 100. The security monitoring system 100 includes client devices 110a, 110b, 110c, and 110d, a network 120, and a security monitoring platform 130.

The client devices 110 are electronic devices that are capable of requesting and receiving resources over the network 120. Example client devices 110 include personal computers, mobile communication devices, and other devices that can send and receive data over the network 120. The client devices 110 typically include a user application, such as a web browser, to facilitate the sending and receiving of data over the network 120, but native applications executed by the client devices 110 can also facilitate the sending and receiving of data over the network 120.

In some examples, the client devices 110 are not associated with a particular user, and use of the client devices 110 is anonymized. For example, the client devices 110 may be available for public use in a public library. In some examples, each client device 110a-d is associated with a particular user. For example, the client devices 110 may be associated with an organization, and a receptionist, Brad, may be associated with client device 110b, while a network engineer, Sarah, is associated with client device 110d. In some examples, the client devices 110 are associated with a particular user once the user provides user authentication information. For example, users may be required to sign in to the client devices 110 before being granted access to the network 120.

In this particular example, client device 110a is shown to be a part of a Company A, client devices 110b and 110c are part of a Company B, and client device 110d is part of a Company C. In some examples, the client devices 110 may belong to organizations such as schools, departments within an organization, groups, geographically organized, etc. For example, the client devices 110 could belong to different cities within a state. In some examples, the client devices 110 may belong to different types of groups. For example, client devices 110a and 110b may belong to an elementary school, while client device 110c belongs to a dentist's office, and client device 110d belongs to the city council.

While this particular example shows four client devices 110, there could be more client devices or fewer client devices within each group and connected to the network 120. For example, there could be one client device, fifteen client devices, three thousand client devices, etc. connected to the network 120.

The client devices 110 are connected through the network 120 to the security monitoring platform 130. In some examples, the client devices 110 are connected to each other through the network 120. For example, the client devices 110 could all belong to a single company and could be grouped according to office locations (e.g., the client devices 110 in California are in one group while the client devices 110 in Munich are in a second group, etc.). The network 120, may be any of various types of networks, such as a local area network (LAN), a wide area network (WAN), the Internet, or a combination thereof. The network 120 may include 802.11 "Wi-Fi" wireless Ethernet (e.g., using low-power Wi-Fi chipsets), Bluetooth, networks that operate over AC wiring, or Category 5 (CAT5) or Category 6 (CAT6) wired Ethernet network. In some examples, the network 120 may be a mesh network constructed based on the devices connected to the mesh network.

In some examples, the client devices 110 may communicate with each other through the network 120. For example, the client devices 110 may upload or download files through the network 120 to a remote storage location accessible by each of the client devices 110. In some examples, some of the client devices 110 are connected to each other through the network 120. In some examples, the client devices 110 are only connected to the security monitoring platform 130 through the network. In some examples, some client devices 110 may be connected to each other through other networks, such as a LAN or a mesh network.

In this example, the network 120 may be the Internet, and users may use the client devices 110 may access the network 120 to download external files, access websites, perform searches, etc. In some examples, the client devices 110 may receive a search result in response to a search query submitted to a search engine on the Internet. A search result is data generated by the search engine that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. In some situations, the search engine can be part of, or interact with, an application store (or an online portal) from which applications can be downloaded for install at a client device 110 in order to present information about downloadable applications that are relevant to a submitted search query.

Users may perform various other actions using the client devices 110. For example, users may access local electronic documents, use local applications, communicate within an organization, communicate outside of an organization, etc.

In some examples, the security monitoring platform 130 receives user activity data from the client devices 110 that indicate user actions, user behavior, user history, etc. For example, the security monitoring platform 130 may receive user activity data including stored cookies, browser history, stored settings, etc. Alternatively, or additionally, the security monitoring platform 130 may receive user activity data indicating various other information, including application installation history, file download history, login history, settings change history, etc.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, control over personal information about users may be exercised at an organizational level. For example, a corporation's security team may determine personal information settings for users within the corporation. In such examples, administrative users may have control over how information is collected about users within their organization or how the information is used by a content server. In some examples, individual users may have control over privacy and personal information settings. Thus, the user may have control over how information is collected about him or her and used by a content server.

The security monitoring platform 130 receives user activity data from the client devices 110 through the network 120 and determines, based on the user activity data and other relevant data, whether to perform a remedial action. The security monitoring platform 130 includes a risk model 140, a user profile database 150, and an action generator 160.

The risk model 140 receives and processes user activity data to determine a risk assessment. In some examples, the risk model 140 determines a risk assessment for a particular user. For example, the risk model 140 may receive user activity associated with a particular user, and determine a risk assessment for the particular user. In some examples, the risk model 140 determines a risk assessment for a particular device. For example, the risk model 140 may receive client device activity data from the client devices 110 that are not associated with a particular user. This client device data may be used to determine a risk assessment for the particular client device 110. In some examples, the risk model 140 determines a risk assessment for a particular group, an organization, a network, etc. For example, the risk model 140 may receive user activity data for an entire organization, aggregate the data, and determine a risk assessment for the entire organization. In some examples, an organization includes a group of users, such as a division of a corporation, a class within a middle school, etc. In some examples, a network includes a group of devices, such as a group of client devices 110 that may belong to the same organization.

In some examples, the risk model 140 may use a rule set. For example, the risk model 140 may use a set of predefined rules to determine a risk assessment. In some examples, the risk model 140 may include multiple separate models that receive and process different types of data. For example, the risk model 140 may include one model for processing file download histories and a separate model for processing browser histories.

In some examples, the risk model 140 may use various other structures or systems to determine a risk assessment. For example, the risk model 140 may be a model which accepts user activity data. The risk model 140 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the risk model 140 may use supervised learning. In some examples, the risk model 140 may use unsupervised learning.

In some examples, the risk assessment determined by the risk model 140 includes one or more hygiene scores. For example, a risk assessment for a particular user may include one score for the user's password hygiene (e.g., how strong the user's network password is, how different each of the user's new passwords are from their previous passwords, etc.), a different score for the user's external file etiquette (e.g., how often the user downloads unknown files from external websites, what kind of files the user opens from external emails, etc.), and another score for whether the user's client device 110 is up-to-date on antivirus definitions.

In some examples, the risk assessment includes an overall hygiene score. For example, a risk assessment for a particular user may include an overall score that is determined based on individual scores for different security aspects. The overall score may provide a holistic representation of the user's general security hygiene practice, and may allow an administrative user of the security system 100 to understand the risk to their organization as a whole.

The risk assessment may be determined based on the user activity data representing user device actions taken by the user. For example, the risk assessment may be based on the likelihood that the device actions taken by the user increase the odds of an adverse cyber-security event (e.g., a breach, the propagation of a virus, etc.). In some examples, the risk assessment may be based on the user's habits over time, such as using the same password on multiple sites, never logging out of websites while in public areas, etc. In some examples, the risk assessment may be based on the particular user's propensity for certain types of behavior, such as downloading known malware or unknown software, clicking suspicious links in emails, visiting unsafe or unknown websites, etc. In some examples, the risk assessment may be based on the particular user's web-browsing habits and preferences. For example, the risk assessment may determine whether the user often visits websites over plain-text Hypertext Transfer Protocol (HTTP), whether the user often visits websites that track user data, etc. In some examples, the risk assessment may account for whether the user generally sends unencrypted or confidential information over the network 120, through email, etc. In some examples, the risk assessment may account for whether the user installs non-approved applications on the client devices 110, whether the user runs out-of-date or unpatched applications, whether the user runs applications that require access to sensitive system resources or a large number of permissions, etc.

The risk assessment may be determined based on various factors in addition to user activity data representing device actions taken by the user. For example, the risk assessment may be based on the type of authentication modes used by an organization to which a user belongs (e.g., two factor authentication v. multi factor authentication v. just a password, etc.). In some examples, the risk assessment may be based on the resources to which the user has access, or the user's responsibilities within an organization. For example, the risk assessment may account for whether the user is a network administrator that can bypass an endpoint firewall, whether the user can run as root, etc. In some examples, the risk assessment may account for whether the user can access information pertaining to other users within the organization or group. For example, the risk assessment may determine whether the user has access to/has transmitted/has possession of user information associated with other users.

The user profile database 150 may store user risk assessment data and/or other user data associated with users of the client devices 110 and the network 120. The risk model 140 may store generated reports and/or risk assessments in the user profile database 150. For example, the risk model 140 may store each iteration of a particular user's risk assessment in the user profile database 150 and associate the entries with the particular user so that the risk model 140 can access the stored entries to use historical data for future risk assessments or reports.

In some examples, the user profile database 150 includes user profile data that includes specific rules to be applied to a particular user, user activity history, user browser history, etc. In some examples, the user profile database 150 includes user profile data that includes the user's associated devices, group, organization, etc. In some examples, the user profile database 150 includes user profile that indicates the user's responsibilities within an organization, the resources to which the user has access, the sensitive information the user has access to, etc. For example, the user profile database 150 may indicate that a particular user is in the payroll department, and is responsible for overseeing distribution of the marketing department's paychecks.

In some implementations, the database 150 may be a profile database 150 that stores various types of profile data, including user data and client device data. For example, the system 100 may be directed to determining a risk assessment for a particular client device based on actions taken by the client device, and in such examples, the database 150 may store client device data.

The action generator 160 uses the risk assessment generated by the risk model 140 and various other factors to determine whether to perform a user-specific remedial action. If the action generator 160 determines that a remedial action is to be taken, the action generator 160 also determines an appropriate action to be taken. In some examples, the action generator 160 can use the report generated by the risk model 140 to determine whether to perform user-specific remedial actions. In some examples, the action generator 160 uses the user profile data from the user profile database 150 to determine whether to perform user-specific remedial actions.

In some examples, the platform 130 implements a remedial action to be performed at a client device 110. For example, a user for whom it is determined that a remedial action is necessary may be associated with a particular client device 110. The action generator 160 may perform an action at the particular client device 110. In some examples, the remedial action is device-specific and is targeting a particular action or behavior being performed by the client device. For example, if a particular client device 110 that is accessible to all staff members within a coffee shop is discovered to have a malicious executable file (.exe) on it, and someone has tried to execute the file, the remedial action may be performed on that particular client device 110.

In some examples, the action generator 160 may perform an action across all users of a particular group or organization. For example, if a particular user performs an action, such as opening an email attachment from an external address, that compromises the cyber-security of the entire organization, the action generator 160 may block access to the particular email attachment for all users.

In some examples, the remedial action is user-specific, and depends on the particular user's risk assessment and previous actions. For example, if a user generally has good cyber-security habits and has a good risk assessment, the action generator 160 may determine that it is not necessary to perform a user-specific remedial action for that user for a particular action or particular situation. In another example, if a user generally has poor cyber-security habits and has a bad risk assessment, the action generator 160 may determine that it is necessary to perform a user-specific remedial action for that user for the particular action or the particular situation.

In some examples, users with poor risk assessments will have remedial actions executed more frequently than users with good risk assessments. In some examples, whether a remedial action is performed depends on a user's responsibilities within an organization. For example, if a user has access to sensitive information, the action generator 160 may determine that it is necessary to perform a remedial action, even if the user has a good risk assessment.

In some examples, the action generator 160 may determine whether to perform a remedial action based on predetermined thresholds or rule sets. For example, the action generator 160 may determine that is necessary to perform a remedial action if a user has a risk assessment that is below a predefined threshold. In some examples, the threshold may be different for different users. For example, a user with access to administrative passwords may be held to a higher threshold than a user who only has permission to access their own files.

In some examples, the action generator 160 may determine whether to perform a remedial action using various decision making structures or systems. For example, the action generator 160 may be a model which accepts user activity data. The action generator 160 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the action generator 160 may use supervised learning. In some examples, the action generator 160 may use unsupervised learning.

Figure 1B:
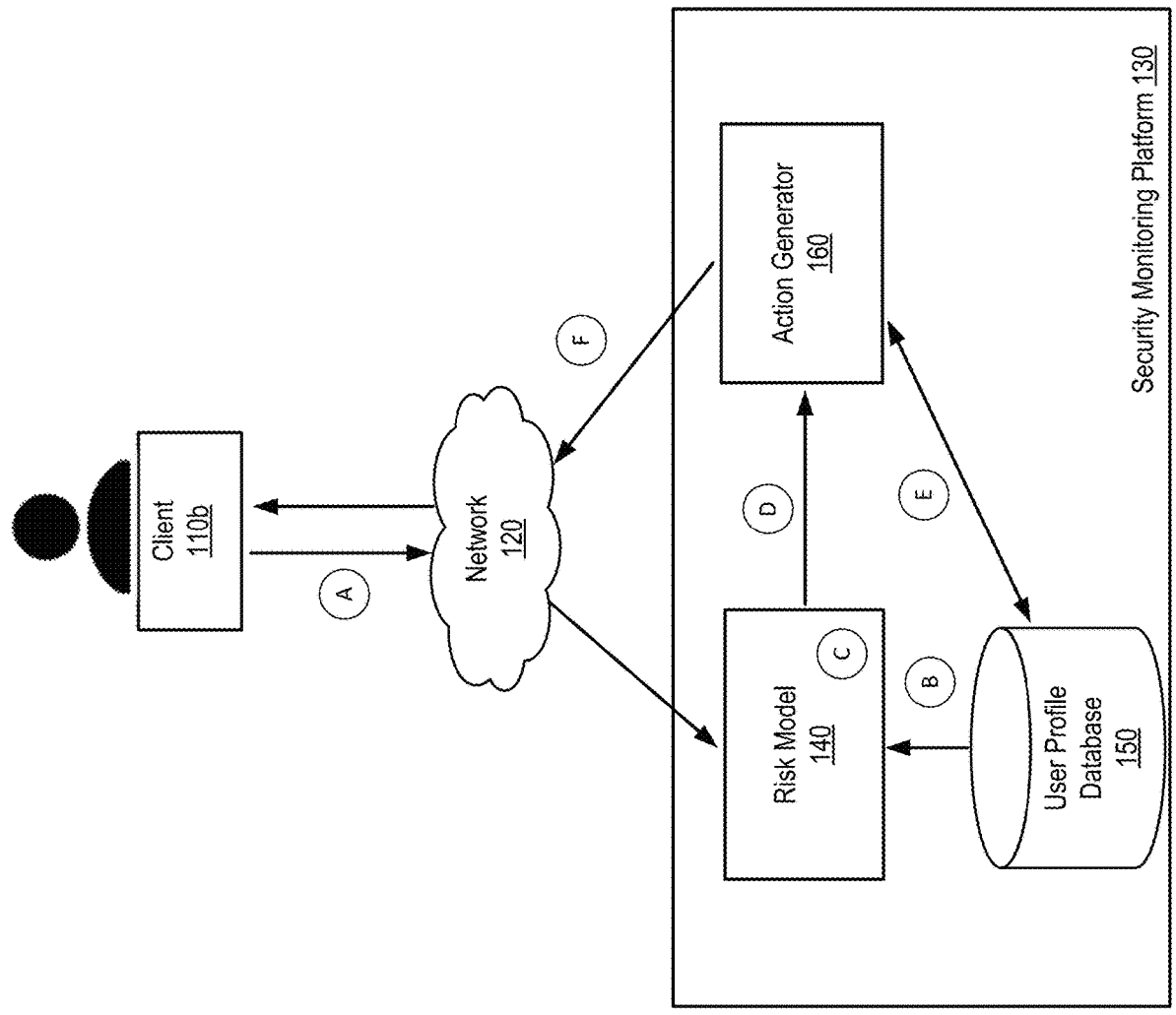
FIG. 1B is a data flow diagram that illustrates an example flow of data during a process for performing security monitoring.

FIG. 1B is a data flow diagram that illustrates an example of a process 180 for generating a remedial action based on a risk assessment determined from user device action data. In the process 180, the remedial action is user-specific. In other implementations, the remedial action can be device-specific, and may be executed without notifying a user. The process 180 may be performed by a system such as the security monitoring system 100.

The process 180 spans stages (A) through (F). Stages (A) through (F) may occur in the illustrated sequence, or they may occur in a suitable sequence that is different than in the illustrated sequence. In some implementations, the process 250 is repeated. In some implementations, only certain stages of the process 250 is repeated.

The process 180 begins with stage (A) in which activity data is transmitted from a client device 110b to the security monitoring platform 130 through the network 120. In this example, the activity data is user-specific device action data. User device action data can include logs of actions taken by a user through the device, such as downloads initiated, emails sent, files accessed, and various other actions. The user device action data can be received by various components of the security monitoring platform 130, including the risk model 140.

The process 180 continues with stage (B) in which the risk model 140 accesses profile data from the database 150. In some implementations, the risk model 140 considers historical data. For example, the risk model 140 may access historical user data from the database 150. In some implementations, the risk model 140 considers other user behavior, including a user's responsibilities within an organization. For example, if a user has access to sensitive financial information, or if the user is responsible for many other users, the risk model 140 may consider the user's responsibilities by assigning weights to particular factors of the risk assessment.

The process 180 continues with stage (C) in which the security monitoring platform 130 determines a risk assessment for the user using the risk model 140. In this example, the risk model 140 uses the activity data received to determine a risk assessment for the user. In some implementations, the risk model 140 uses the activity data received to determine a risk assessment for a particular client device 110. In some implementations, the activity data may be for a current activity, and may not include historical data. The risk model 140 may use the accessed profile data from the database 150 in addition to the activity data received from the particular client device 110 in determining the risk assessment for the user. The risk assessment may be a health score. In some implementations, the health score may be calculated by averaging scores assigned to the user's actions over a particular period of time. For example, the scores of either 0 or 1 may be assigned to a user's actions based on whether the user's action is considered a risk, and the average of the scores assigned to a user's actions over the past week can be calculated to determine a risk assessment for the user. In other implementations, the risk assessment may be determined using various other methods described below.

The process 180 continues with stage (D) in which the action generator 160 receives the generated risk assessment from the risk model 140. In some implementations, the risk model 140 provides the risk assessment to the action generator 160. In other implementations, the action generator 160 access the risk assessment from the risk model 140. The action generator 160 determines, based on the risk assessment, whether a remedial action is needed. In some implementations, the action generator 160 determines whether a remedial action is needed in real-time, in response to a user device action or other action. For example, the action generator 160 may determine whether a remedial action is needed when a risk assessment for a particular user or client device is updated. In some implementations, the action generator 160 periodically determines whether a remedial action is needed by accessing risk assessment data from the risk model. For example, the action generator 160 may monitor risk assessments every 15 minutes and determine whether a remedial action is needed based on the risk assessments.

In implementations in which the risk assessment generated by the risk model 140 does not include historical user data or profile data, such as user responsibilities, user historical data, client device location, client device load, and various other characteristics of the user or device, the action generator 160 may access profile data from the database 150 in stage (E) to use in combination with or the risk assessment to determine whether a remedial action is needed.

In some implementations, the risk model 140 stores the generated risk assessments in the database 150 and the action generator 160 accesses profile data from the database 150 in stage (E) in combination with the risk assessment generated by the risk model 140 to determine whether a remedial action is needed. For example, the action generator 160 may determine that a user is currently trying to download a suspicious attachment from their email, that the user often tries to download suspicious content from external emails, and that the remedial action including cancelling the download needs to be performed. In some implementations, the remedial action includes informing a user that a remedial action is being performed. In some implementations, the remedial action is performed automatically, and does not notify a user that the remedial action is being performed.

The process 180 continues with stage (F) in which the action generator 160 provides the remedial action to the client device 110b over the network 120. If the action generator 160 determines that a remedial action is needed, the action generator 160 may transmit an instruction to execute the remedial action to the client device 110b through the network 120. For example, the instruction to cancel the download may be sent from the security monitoring platform 130 to the client device 110b through the network 120. The remedial action may include providing a notification to the user who initiated the download that the download is being cancelled. In such examples, the instruction sent to the client device 110b includes the instructions to display a notification to a user through a display of the client 110b.

Figure 2:
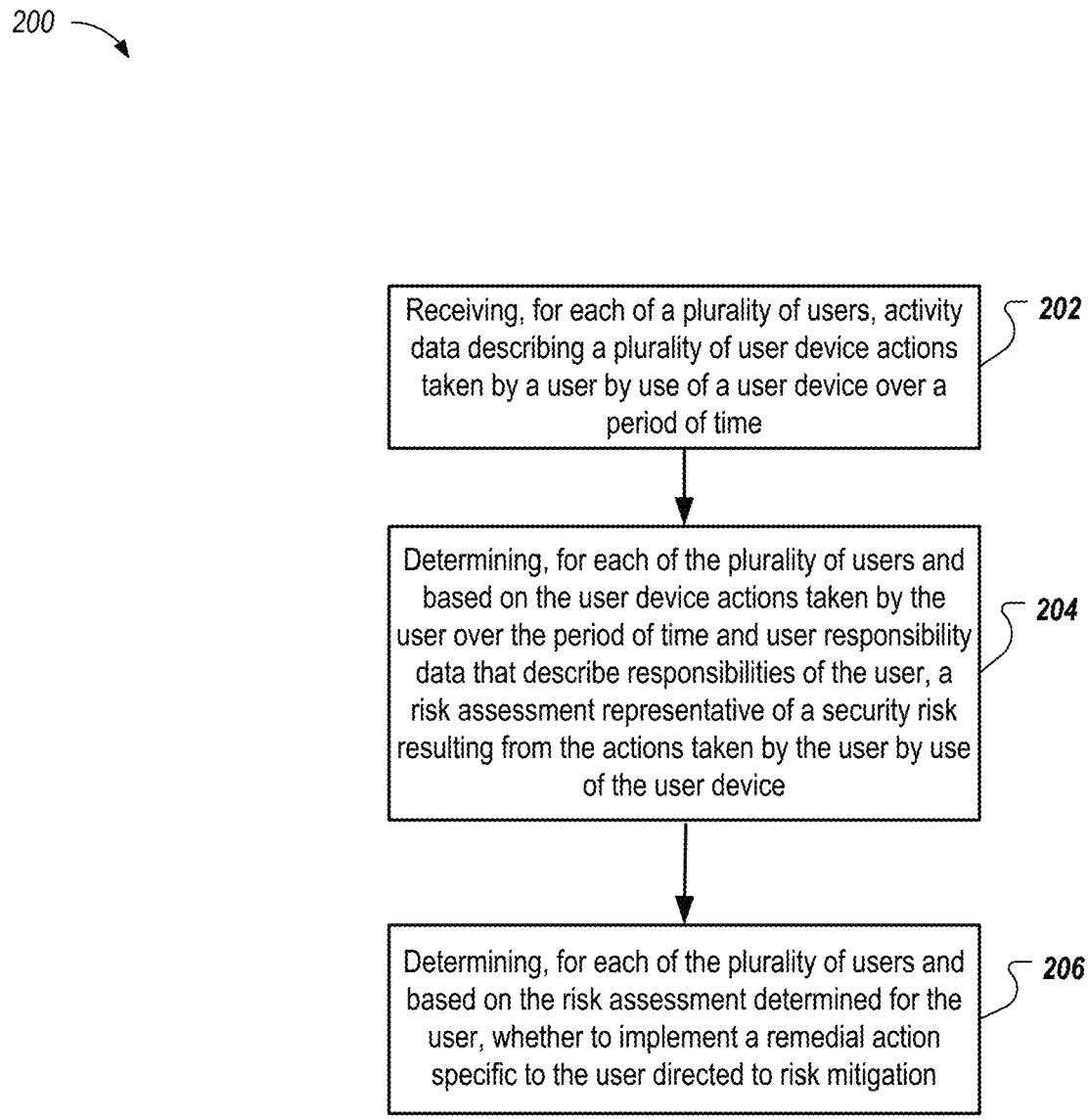
FIG. 2 is flow diagram that illustrates an example of a process for performing security monitoring.

FIG. 2 is a flowchart of an example process 200 for performing security monitoring. The process 200 may be performed by a system such as security monitoring system 100.

The process 200 includes receiving, for each of a plurality of users or client devices, activity data describing user device actions taken by a user or a device over a period of time (202). For example, the security monitoring platform 130 may receive user activity data from each of the client devices 110a-d. The user activity data may be associated with particular users of the client devices 110. In some implementations, the user activity data are specific to the client devices 110, and are not associated with a particular user.

The process 200 includes determining, for each of the plurality of users or client devices and based on the user device actions taken by the user or the device over the period of time and user responsibility data that describe responsibilities of the user, a risk assessment representative of a security risk resulting from the user device actions taken by the user or the device (204). For example, the risk model 140 may determine, based on the user device actions taken by the user over the period of time, a risk assessment for the user. The risk model 140 can access user responsibility data for the user that indicate responsibilities of the user within the user's organization, including the sensitivity of the documents the user may access, the number of other users the user is responsible for, etc. In some examples, the risk model 140 may access the user profile database 150 to use user profile data in determining a risk assessment for the user. In some examples, the risk model 140 updates a user's risk assessment. In some examples, the risk model 140 determines a new risk assessment for a particular user each time user activity data is received for the particular user.

In some implementations, the risk model 140 can determine, based on the user device actions taken by a particular client device over a period of time, a risk assessment for the particular client device. In such examples, the risk model 140 may access the profile database 150 to use client device profile data in determining a risk assessment for the client device. For example, the risk model 140 can access device actions taken within the last week from the particular client device. The device actions may indicate that the only actions taken using the particular client device are to access email, and that the particular client device has been sending and receiving only encrypted data. The risk model 140 may then determine a risk assessment for the particular client device, such as a health score, that indicates a low risk based on the actions taken using the particular client device.

In some examples, the risk model 140 can generate reports for presentation to users of the security monitoring system 100. For example, the risk model 140 can generate a report including a user's risk assessment or a particular device's risk assessment and particular factors that were used to determine the risk assessment. In some examples, the risk model 140 may include the factors that have the most impact on the user's risk assessment. For example, if the user generally has good security hygiene, but often downloads external files from the Internet over the network 120, the report may highlight the user's propensity to download external files.

In some examples, the risk model 140 can generate a report mapping users or devices and their risk assessments. For example, the risk model 140 may generate a report mapping users in different offices of a particular corporation and their respective risk assessments and most common behaviors, or mapping particular devices within different departments of an organization and their respective risk assessments. In some examples, the reports generated by the risk model 140 may be used by administrators of an organization to analyze user behavior and to determine how to improve the organization's cyber-security as a whole.

In some examples, the risk model 140 may compare a particular user's or device's risk assessment with one or more other users' risk assessments. For example, the risk model 140 may compare a particular user's risk assessment with other users in the particular user's division. The risk model 140 may compare a particular device's risk assessment with other devices in different departments to determine whether one department's device usage results in higher risk than another department. In some examples, the security monitoring platform 130 may provide the comparison to an administrative user of the security monitoring system 100 or to the particular user. In some examples, providing the comparison includes providing a ranking within the division. For example, a particular user may receive their risk assessment and may receive an overall ranking of their risk assessment in comparison to their coworkers in their particular division. In this example, providing the user with their risk assessment in comparison to their coworkers may provide the user with an incentive to improve their risk assessment in relation to their coworkers' risk assessments.

The process 200 includes determining, for each of the plurality of users or devices and based on the risk assessment determined for the user or device, whether to implement a remedial action specific to the user or device directed to risk mitigation (206). For example, the action generator 160 may determine whether to generate a user-specific remedial action for the user. The action generator 160 may determine whether to generate a device-specific remedial action for the particular client device. The action generator 160 accesses the risk assessment for the user or device from the risk model 140. In some implementations, the risk model 140 provides the risk assessment to the action generator 160. In some implementations, the action generator 160 accesses the risk assessment from the risk model 140. In some examples, the risk model 140 stores the generated risk assessment for the user or device in the database 150, and the action generator 160 accesses the risk assessment from the database 150. In some examples, the action generator 160 accesses the user profile database 150 to consider historical user data or user profile data in combination with the generated risk assessment to determine whether to perform a remedial action, and what kind of remedial action to perform.

In some examples, the remedial action includes presenting a user with a message and requesting a response before allowing the user to continue with the action they are currently taking. For example, the remedial action may include presenting a pop-up message that asks the user to confirm that they are sure they would like to open the file from an unverified source. In some examples, the remedial action may include asking the user for justification before allowing the user to continue with the action. For example, the remedial action may include presenting a pop-up message asking the user to provide a reason that will be reviewed later by system administrators for why they need to install a particular program.

In some examples, the remedial action may include preventing a user from completing an action. For example, the remedial action may include presenting a message to the user informing the user that the action they are trying to take will not be executed. In some examples, the remedial action may include preventing a user from completing an action without informing the user. For example, if a user has a poor risk assessment and is trying to download a file, the system 100 may prevent the user from downloading the file without presenting a dialog.

The remedial action may vary for different users. For example, if two users have the same risk assessment, but different organizational responsibilities, or access to different sets of data, a remedial action taken for one user may differ from a remedial action taken for the other user. In some examples, a remedial action may not be taken for a particular user who has the same risk assessment as a different user if the users have different responsibilities or access to different resources.

In some examples, the remedial actions could be uniformly applied. For example, remedial actions for the person within an organization with the poorest risk assessment may be applied to the organization. In some examples, the action generator 160 may target users based on their risk assessment. For example, the action generator 160 may target users with the poorest risk assessments before performing remedial actions for other users with better risk assessments.

In some implementations, the remedial actions can be taken without notifying a user of the action. For example, a remedial action for a particular client device may be to cancel a current file download from an untrusted website. The action generator 160 may transmit the remedial action to the particular client device through the network 120 without notifying a user of the particular client device. In such examples, the remedial action, e.g., cancelling a current download, may be performed without notifying a user of the device.

The security monitoring operations discussed can occur substantially in real-time. For example, the client devices 110 can provide user activity data at regular intervals, e.g., every 10 seconds, every 30 seconds, or at another interval. The action generator 160 can determine whether to perform remedial actions as needed, which may or may not be at a fixed interval. For example, the action generator 160 may perform a user-specific remedial action for a user for a range of time, or until the user's activity data and risk assessment suggest that the remedial action is no longer needed. In addition, or as an alternative, the action generator 160 may dynamically and/or asynchronously perform remedial actions at client devices 110 to respond to temporary or unusual conditions. For example, if a malicious email has been sent to an entire organization, the action generator 160 may perform remedial actions at all client devices 110 within the organization to quarantine the email.

In some examples, the risk model 140 and/or the action generator 160 may use federated learning. For example, by updating risk assessments for particular users with information learned by the centralized security monitoring platform 130, the system 100 provides a system-level reinforcement learning through the network 120. Generalized rules gleaned from a high-level view of user behavior and the effectiveness of certain remedial actions may be applied to particular users, groups, organizations, etc.

Additionally, the risk model 140 for different groups with different users may be updated to use different parameters to focus on important variables for the particular group. In some examples, the use of distributed control of each group of users allows the use of customized parameters, and thus cyber-security for each group may be fine-tuned and optimized according to user behavior and actions for each group, organization, etc.

The security monitoring system 100 may conduct testing of remedial actions across multiple users, groups, organizations, etc. For example, the security monitoring system 100 may restrict access to sensitive resources for users with poor risk assessments instead of allowing users to provide a justification before accessing the resources. The security monitoring system 100 then analyzes the results of the change and applies any changes to be made across multiple users, groups, organizations, etc. In this particular example, if restricting access to sensitive resources improved average user risk assessments, the security monitoring system 100 may restrict access to resources for more users instead of allowing the users to provide justifications or verification before accessing resources. The security monitoring system 100 may update the risk model 140 and/or the action generator 160 to reflect the results of the testing. In some examples, the testing, analysis, and updating of the risk model 140 and/or the action generator 160 is part of an automated process run by the security monitoring system 100. For example, the security monitoring system 100 may be given a set of variables to change. In some examples, the security monitoring system 100 may automatically determine variables that could be tested and perform the tests. By modelling remedial actions at a system level, high-level results that improve cyber-security across an organization, can theoretically be achieved.

Figure 3:
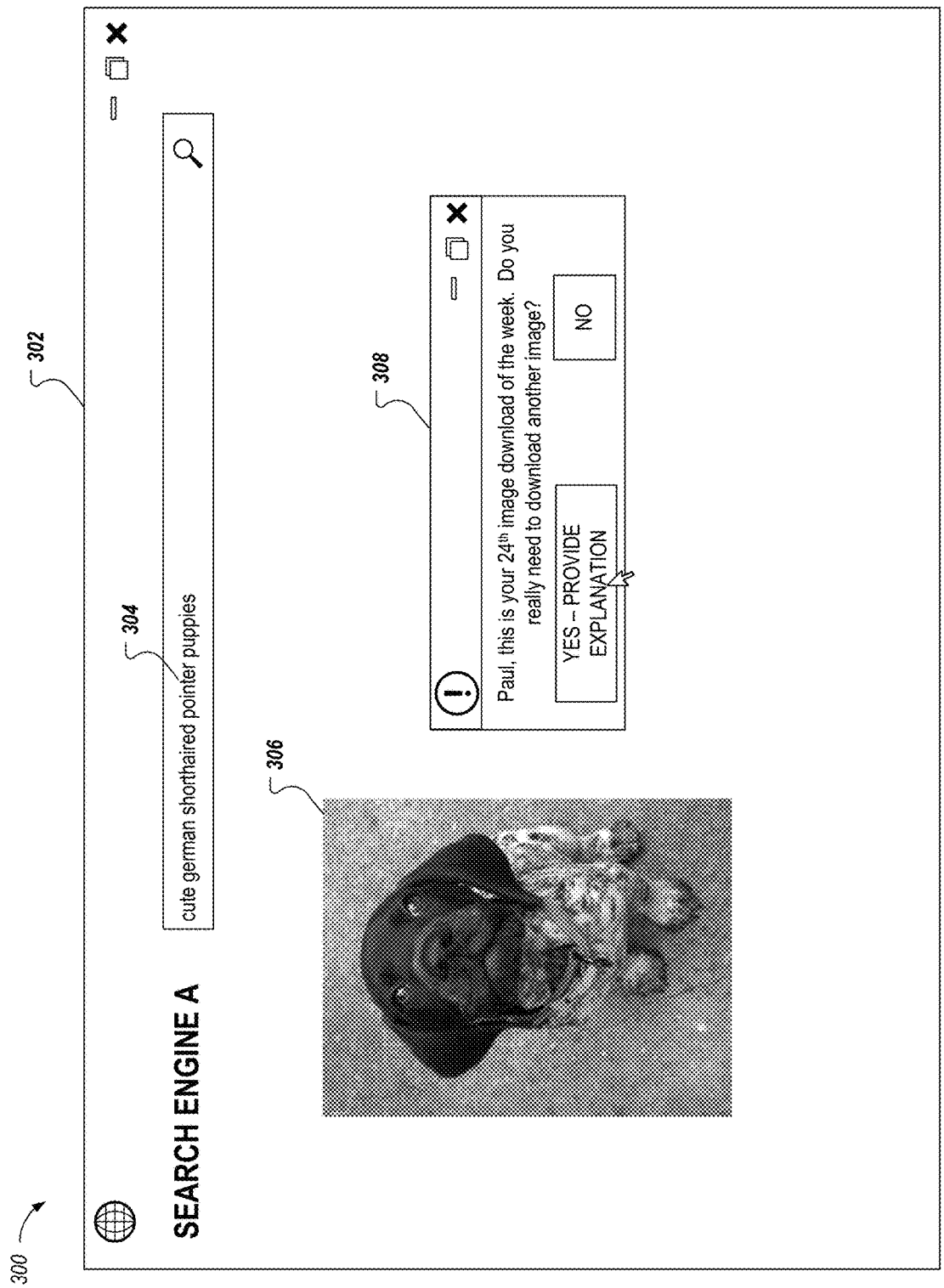

FIG. 3 is an illustration of an example interface 300 that may be shown when a security monitoring system performs a user-specific remedial action. In some examples, the security monitoring system is the security monitoring system 100 as described above with respect to FIG. 1.

In this particular example, a user named Paul has opened a web browser 302 and submitted a search query 304. Upon receiving results to his search, Paul attempts to download one of the results, which is an image 306. The system 100 determines, based on Paul's user activity data and risk assessment, that a remedial action should be performed. The remedial action selected is presenting a message 308 to Paul asking him to provide justification for his download.

In some examples, the risk model 140 may determine, based on user activity data indicating actions such as submitting a search query for keywords associated with suspicious results, attempting to upload sensitive information, installing an unauthorized program, etc. that a remedial action is needed. In some examples, the action generator 160 may be triggered to determine that a remedial action is needed based on certain current actions of a user, additionally, or in the alternative to receiving an updated risk assessment. For example, if a user tries to download a file, the action generator 160 may determine, regardless of a selected threshold for remedial actions, that a remedial action must be performed. In some examples, the action generator 160 determines whether to perform a remedial action based on updates to a user's risk assessment.

In some examples, the remedial action can include presenting notifications to a user informing the user how often they have been performing certain actions within a period of time. In some examples, simply informing the user of their behavior patterns can effect a change in the user's behavior. For example, a notification may be presented to Paul informing him that he has downloaded 23 images in the past week. In some examples, the remedial action can include presenting the user with a dialog through which they will need to provide input before allowing the user to complete their current action. In some examples, the remedial action includes warning the user with when they click a link on an email, and requiring them to accept the risks and consequences of clicking the link. For example, the notification might ask Paul to click a button that reads "I accept that this may be of high risk" before continuing with his download.

In this particular example, the remedial action includes presenting Paul with a dialog asking him to provide justification if he wishes to continue downloading an image. In some examples, the dialog asks the user to justify their business need to perform the actions. For example, if a user is attempting to execute a .exe file, the dialog may ask the user to provide a business need for executing a .exe file. In some examples, the remedial action includes presenting the user with a notification informing the user of how much time they are spending doing the particular action during a period of time. For example, the notification might inform Paul that he has spent 3.6 hours in the past month downloading images.

In some examples, the security monitoring platform 130 can use data to learn which users and/or behaviors that have the largest impact on overall security outcomes. For example, the security monitoring platform 130 can increase the frequency and/or severity of remedial actions performed on users and/or client devices 110 across an organization.

In some examples, the security monitoring platform 130 can experiment to find what works and doesn't work in terms of improving user behavior can include conducting experiments or implementing remedial action changes and assessing the outcomes. For example, the security monitoring platform 130 may transmit certain remedial actions to be performed, such as provide notifications, for certain users with specific attributes in their risk profiles, or within a certain group. By introducing variations to the way remedial actions are determined and applied and observing changes to the outcomes, the security monitoring platform 130 can be trained to determine which remedial actions are most effective for particular types of users or situations for users and for the organization as a whole. In some examples, the security monitoring platform 130 can use various "explore and exploit" techniques, in which data is acquired or used. For example, the security monitoring platform 130 can use variations of solutions for the multi-armed bandit problem or the contextual bandit problem (e.g., an Epsilon-greedy strategy, and Epsilon-first strategy, an Epsilon-decreasing strategy, an adaptive or contextual strategy, etc.), a greedy algorithm, etc.

Figure 4:
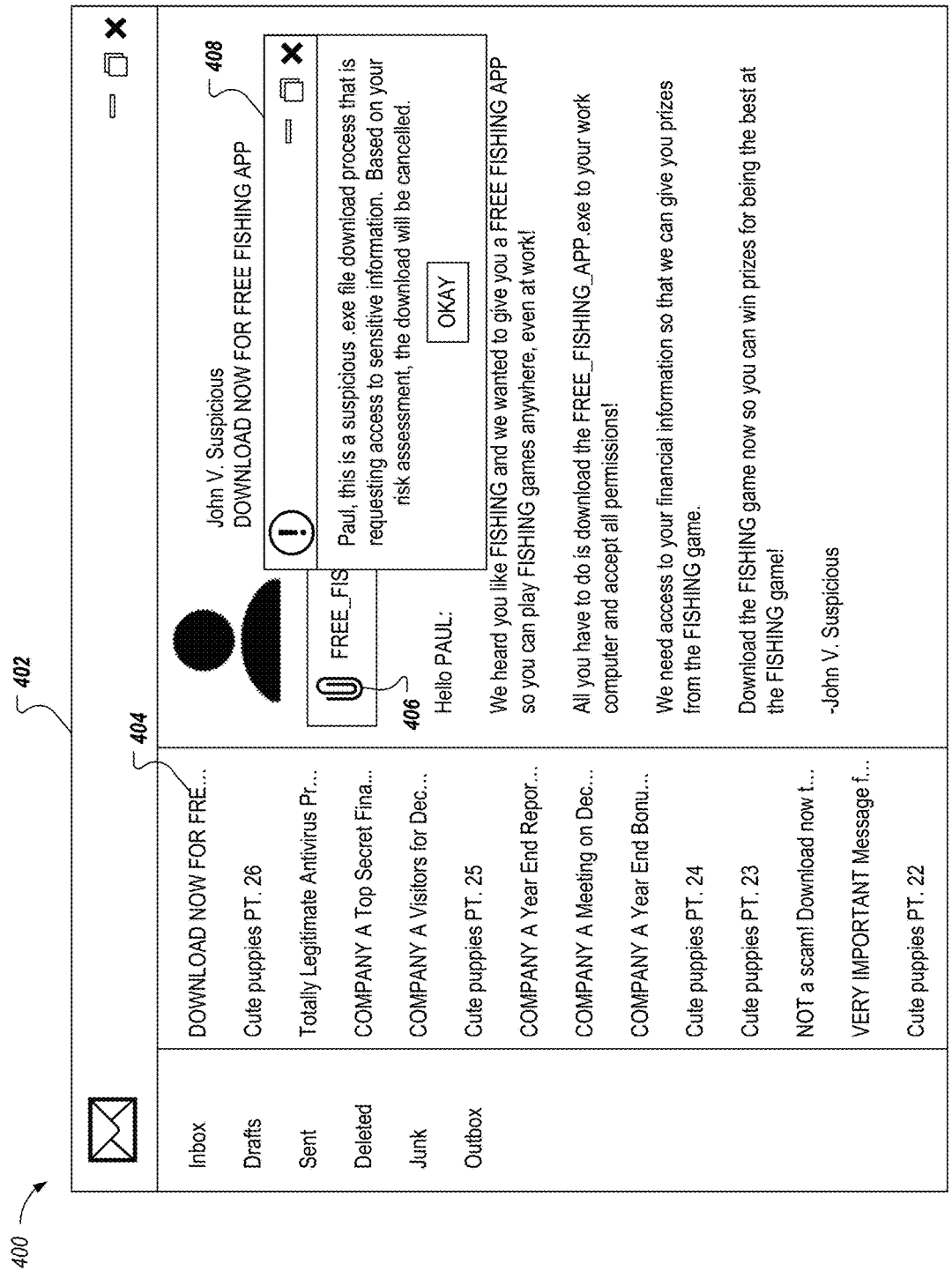

FIG. 4 is an illustration of an example interface 400 that may be shown when a security monitoring system performs a user-specific remedial action. In some examples, the security monitoring system is the security monitoring system 100 as described above with respect to FIG. 1. In this particular example, a user named Paul has an email application 402 open and has opened an email 404. The email 404 contains an attachment, which Paul attempts to download. The action generator 160 determines, based on Paul's user activity data and risk assessment, that a remedial action should be performed. The remedial action selected 408 is cancelling the download. In this example, the remedial action includes informing Paul that because of his risk assessment, the download is cancelled.

In some examples, the risk model 140 may determine, based on user activity data, that a user is attempting to perform actions such as opening a suspicious email, attempting to install unverified software, etc. In this particular example, the risk model 140 has determined, based on user activity data, that Paul is attempting to download a file. The file download process is requesting access to sensitive information, and based on Paul's risk assessment, the download will be cancelled. Paul is not offered a choice to continue the download.

In some implementations, the remedial action includes presenting the user with a notification that informing them that the action they are currently trying to complete will not be completed. In some examples, the remedial action includes directly preventing the action without notifying the user. For example, if the user tries to install unauthenticated software, the remedial action may include preventing the user from installing the software without providing a notification.

In some implementations, the remedial action includes taking actions such as reducing available bandwidth and restricting download speeds to provide obstacles to reduce risky behavior. For example, the remedial action may include slowing downloads of files from unknown and/or untrusted websites to discourage potentially malicious downloads. In some examples, the remedial action includes slowing down the rendering of unknown websites in the user's browser to discourage users from visiting potentially dangerous websites. In some examples, the remedial action includes restricting user access to resources. In some examples, the remedial action includes completely blocking access to unknown software and/or websites. In some examples, the remedial action includes restricting a user completely to pre-approved, or whitelisted, files, websites, resources, etc. only. In some examples, the remedial action includes slowing down or blocking uploads of data. For example, the remedial action may include preventing a user from uploading data to third party cloud services.

In some implementations, the remedial action is determined based on the user activity data in addition to the user's current actions and the user's risk assessment. For example, Paul has never downloaded a binary file, but he has a terrible risk assessment (e.g., never changes his password, downloads too many suspicious files, etc.), and this time, Paul wants to download a binary file, and the security monitoring platform 130 will not let him download the file.

FIG. 5 is an illustration of an example interface 500 that may be shown when a security monitoring system performs a user-specific remedial action. In some examples, the security monitoring system is the security monitoring system 100 as described above with respect to FIG. 1. In this particular example, a user named John has a web browser 502 open and has entered a query 504 to a search engine. The results to John's query 504 are presented, and John selects a link 506. However, the action generator 160 determines that a remedial action should be performed, and presents John with a message 508 informing John that he is a high risk user, and that he can improve his risk assessment by reducing the number of suspicious websites he visits, such as the one he is trying to click on. The message 508 asks John if he would like to take a different action, such as navigate away from the site.

In some examples, the remedial action may include suggesting different actions for a user to take, in addition, or in the alternative, to the current action the user is attempting to take. In this particular example, remedial action includes suggesting that John navigate away from the site he is trying to access, instead of navigating to the site he clicked on. In some examples, the remedial action includes presenting a user with a report of their risk assessment. In this particular example, the remedial action includes informing John that he is a high risk user. In this particular example, John's risk assessment includes a score. In some examples, the security monitoring platform 130 may provide a user with a suggestion to improve their risk assessment score. In this particular example, the remedial action includes providing a notification that suggests that John navigate away from the suspicious website he is currently trying to visit.

In some examples, the remedial action may include comparing the user's risk assessment to other users' risk assessments. For example, the user may be provided with a report comparing their risk assessment to the risk assessments for each of their coworkers within a single division of a company. In such a situation, the user may be provided with a notification reminding them that they have fallen into the bottom half of their division, and that they need to improve their usage habits, such as reducing the amount of times that they attempt to download documents over unsecured connections every week, to improve their risk assessment ranking. In some examples, the report comparing users' risk assessments includes a ranking of the user compared to their coworkers. Providing a ranking may provide gamification of the security monitoring system, and provide incentive for users to improve their security habits.

In some examples, the remedial action may include providing notifications to users who are close to improving their risk assessment ranking. For example, the remedial action may include providing a notification to a user who is one action away from improving their risk assessment. For example, the remedial action may include providing a notification to a user that they are about to use the same password they use on an internal system of their organization as the external website the user is on. The remedial action may further include a suggestion, such as using a different password, to improve the user's risk assessment. In some examples, the remedial action includes providing the user with a message informing them of their ranking relative to specific ranking. For example, if the user has set a goal to be within the top 10% of risk assessment rankings, the remedial action may provide the user with a message suggesting actions for the user to take to improve their ranking.

In some examples, the remedial action includes mapping each user of an organization and their risk assessment. For example, the remedial action may include generating a mapping of each user at their ranks within a public school system and providing the user's risk assessment and responsibilities.

Figure 6:
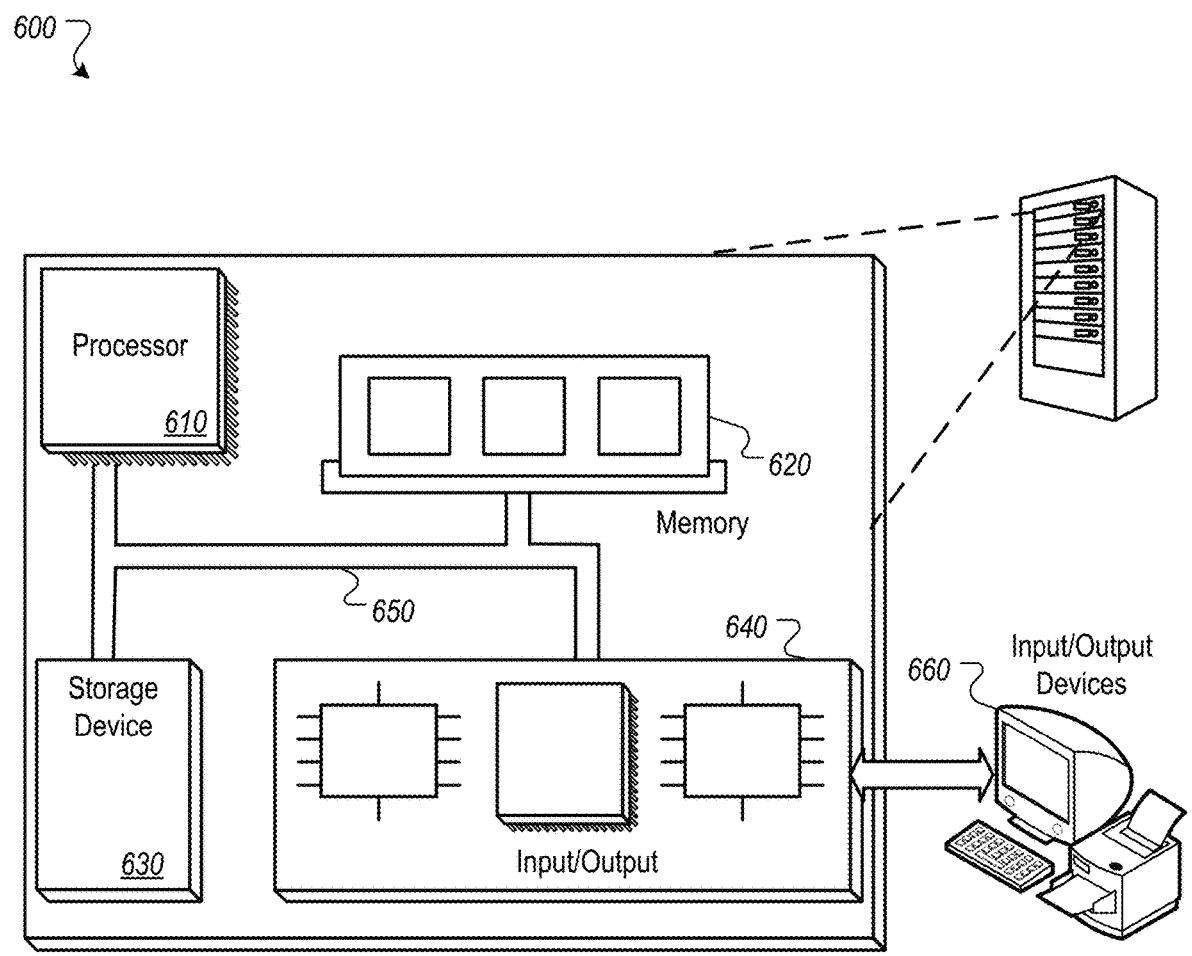
FIG. 6 is a block diagram of an example computing system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at a data processing apparatus and for each of a plurality of users within an organization: (i) user activity data describing a plurality of actions taken by the user by use of a user device over a period of time and risks associated with the actions, and (ii) user responsibility data describing responsibilities of the user within the organization, wherein:
the user responsibility data comprises sensitivity assessment data characterizing a security risk associated with data to which the user has access; and
the plurality of users within the organization comprises users having access to data associated with different security risks;
processing, by the data processing apparatus and for each user: (i) the user activity data describing the actions taken by the user by use of the user device over the period of time and the risks associated with the actions, and (ii) the user responsibility data describing the responsibilities of the user within the organization, using a risk model to generate a risk assessment representative of a security risk resulting from the actions taken by the user by use of the user device; and
determining, by the data processing apparatus, for each user and based on the risk assessment generated for the user, whether to implement a user-specific remedial action directed to risk mitigation, wherein the user-specific remedial action includes presenting a message to the user requesting that the user provide additional input before executing a current user device action being attempted by the user.

2. The method of claim 1, wherein the risk assessment comprises one or more security hygiene scores.

3. The method of claim 1, wherein the risk assessment comprises one or more security hygiene scores, and determining for each user and based on the risk assessment generated for the user, whether to implement a user-specific remedial action directed to risk mitigation comprises determining, based on a user action taken by a user by use of the user device, and the one or more security hygiene scores, whether to implement the user-specific remedial action.

4. The method of claim 1, wherein the risk model comprises a machine learning model, a rule set, or both.

5. The method of claim 1, wherein the user-specific remedial action includes presenting a message to the user, prompting the user not to take a current user device action.

6. The method of claim 1, wherein the user-specific remedial action includes presenting a message to the user, informing the user that a current user device action being attempted by the user will not be executed.

7. The method of claim 1, wherein the user-specific remedial action includes blocking one of: a current user device action being attempted by the user, an activity related to the current user device action, or an activity related to the user's risk assessment.

8. The method of claim 1, wherein the user-specific remedial action includes presenting a report including the user's risk assessment to the user.

9. The method of claim 1, further comprising:
for a particular user:
comparing, by the data processing apparatus, the user's risk assessment to risk assessments of other users within the organization;
determining, by the data processing apparatus and based on the comparing, a rank of the user among the users within the organization; and
providing, by the data processing apparatus and to the user, a message including the rank of the user.

10. The method of claim 1, wherein the user-specific remedial action comprises restricting the user's access to a set of resources.

11. The method of claim 1, wherein the user-specific remedial action includes presenting a message including a prescriptive recommendation to the user.

12. The method of claim 11, wherein the prescriptive recommendation includes a suggested next user device action for the user to take.

13. The method of claim 1, further comprising:
receiving, at the data processing apparatus and for each of the plurality of users within the organization, historical risk assessment data comprising one or more historical risk assessments for the user, wherein each historical risk assessment was generated using the risk model at a respective previous time point;
wherein for each of the plurality of users, using the risk model to generate the risk assessment representative of the security risk resulting from the actions taken by the user by use of the user device comprises:
processing the historical risk assessment data for the user using the risk model to generate the risk assessment for the user.

14. The method of claim 1, wherein the message to the user requesting that the user provide additional input before executing a current user device action being attempted by the user comprises:
a message requesting that the user provide an explanation for the current user device action being attempted by the user.

15. The method of claim 1, wherein the message to the user requesting that the user provide additional input before executing a current user device action being attempted by the user comprises:
a message requesting that the user provide confirmation that the current user device action being attempted by the user should be executed.

16. A system comprising:
one or more user devices; and
a remote server, comprising one or more computing devices and connected to the one or more user devices over a network, that performs operations comprising:
receiving, at the remote server and for each of a plurality of users within an organization from the one or more user devices: (i) user activity data describing a plurality of actions taken by the user by use of a user device over a period of time and risks associated with the actions, and (ii) user responsibility data describing responsibilities of the user within the organization, wherein:

the user responsibility data comprises sensitivity assessment data characterizing a security risk associated with data to which the user has access; and the user responsibility data describes different responsibilities for different users within the organization;

processing, by the remote server and for each user: (i) the user activity data describing the actions taken by the user by use of the user device over the period of time and the risks associated with the actions, and (ii) the user responsibility data describing the responsibilities of the user within the organization, using a risk model to generate a risk assessment representative of a security risk resulting from the actions taken by the user by use of the user device; and determining, by the remote server, for each user and based on the risk assessment generated for the user, whether to implement a user-specific remedial action directed to risk mitigation, wherein the user-specific remedial action includes presenting a message to the user requesting that the user provide additional input before executing a current user device action being attempted by the user.

17. The system of claim 16, wherein the risk assessment comprises one or more security hygiene scores.

18. A non-transitory computer readable medium storing instructions that when executed by one or more computing devices, cause the one or more computing devices to perform operations comprising:

receiving, at the one or more computing devices and for each of a plurality of users within an organization: (i) user activity data describing a plurality of actions taken by the user by use of a user device over a period of time and risks associated with the actions, and (ii) user responsibility data describing responsibilities of the user within the organization, wherein:

the user responsibility data comprises sensitivity assessment data characterizing a security risk associated with data to which the user has access; and the user responsibility data describes different responsibilities for different users within the organization;

processing, by the one or more computing devices and for each user: (i) the user activity data describing the actions taken by the user by use of the user device over the period of time and the risks associated with the actions, and (ii) the user responsibility data describing the responsibilities of the user within the organization, using a risk model to generate a risk assessment representative of a security risk resulting from the actions taken by the user by use of the user device; and determining, by the one or more computing devices, for each user and based on the risk assessment generated for the user, whether to implement a user-specific remedial action directed to risk mitigation, wherein the user-specific remedial action includes presenting a message to the user requesting that the user provide additional input before executing a current user device action being attempted by the user.

19. The non-transitory computer readable medium of claim 18, wherein the risk assessment comprises one or more security hygiene scores.

* * * * *